(12) United States Patent
Radhakrishnan et al.

(10) Patent No.: US 8,626,504 B2
(45) Date of Patent: Jan. 7, 2014

(54) EXTRACTING FEATURES OF AUDIO SIGNAL CONTENT TO PROVIDE RELIABLE IDENTIFICATION OF THE SIGNALS

(75) Inventors: Regunathan Radhakrishnan, San Bruno, CA (US); Claus Bauer, Beijing (CN); Kent Bennett Terry, Millbrae, CA (US); Brian David Link, San Jose, CA (US); Hyung-Suk Kim, Valencia, CA (US); Eric Gsell, Valencia, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/599,992

(22) Filed: Aug. 30, 2012

(65) Prior Publication Data

US 2013/0064416 A1 Mar. 14, 2013

Related U.S. Application Data (62) Division of application No. 12/312,840, filed as application No. PCT/US2007/024744 on Nov. 29, 2007, now Pat. No. 8,259,806.

(60) Provisional application No. 60/872,090, filed on Nov. 30, 2006.

(51) Int. Cl.
*G10L 21/00* (2013.01)
*H04N 11/02* (2006.01)

(52) U.S. Cl.
USPC .............. 704/230; 375/240.15; 375/240.25; 704/219

(58) Field of Classification Search
USPC ................ 375/240.01–29; 703/230
See application file for complete search history.

(56) References Cited

U.S. PATENT DOCUMENTS

| | | | |
|---|---|---|---|
| 5,530,483 A | 6/1996 | Cooper et al. |
| 5,550,594 A | 8/1996 | Cooper et al. |
| 5,751,368 A | 5/1998 | Cooper |
| 5,920,842 A | 7/1999 | Cooper et al. |
| 5,946,049 A | 8/1999 | Cooper et al. |
| 6,098,046 A | 8/2000 | Cooper et al. |

(Continued)

FOREIGN PATENT DOCUMENTS

| | | |
|---|---|---|
| JP | H08-500471 | 1/1996 |
| JP | 2004-519015 | 6/2004 |

(Continued)

OTHER PUBLICATIONS

Fridrich, J. et al., "Robust Hash Functions for Digital Watermarking," Proc. ICIT: Coding and Computing, XX, XX, No. PRO0540, (2000), pp. 178-183, XP002474318.

(Continued)

*Primary Examiner* — David Czekaj
*Assistant Examiner* — Leron Beck (57) ABSTRACT

Signatures that can be used to identify video and audio content are generated from the content by generating measures of dissimilarity between features of corresponding groups of pixels in frames of video content and by generating low-resolution time-frequency representations of audio segments. The signatures are generated by applying a hash function to intermediate values derived from the measures of dissimilarity and to the low-resolution time-frequency representations. The generated signatures may be used in a variety of applications such as restoring synchronization between video and audio content streams and identifying copies of original video and audio content. The generated signatures can provide reliable identifications despite intentional and unintentional modifications to the content.

15 Claims, 6 Drawing Sheets

(56) References Cited

U.S. PATENT DOCUMENTS

| | | |
|---|---|---|
| 6,141,057 A | 10/2000 | Cooper et al. |
| 6,392,707 B1 | 5/2002 | Cooper et al. |
| 6,421,636 B1 | 7/2002 | Cooper et al. |
| 6,469,741 B2 | 10/2002 | Cooper et al. |
| 6,901,209 B1 | 5/2005 | Cooper et al. |
| 6,973,431 B2 | 12/2005 | Cooper et al. |
| 6,989,869 B2 | 1/2006 | Cooper et al. |
| 7,212,651 B2 | 5/2007 | Viola et al. |
| 8,020,180 B2 | 9/2011 | Deng |
| 8,023,773 B2 | 9/2011 | Brunk et al. |
| 2007/0250311 A1 | 10/2007 | Shires |
| 2009/0080784 A1 | 3/2009 | Luh |
| 2010/0254568 A1 | 10/2010 | Chen |
| 2011/0216937 A1 | 9/2011 | Radhakrishnan |
| 2011/0261257 A1 | 10/2011 | Terry |
| 2011/0268315 A1 | 11/2011 | Bauer |
| 2012/0054194 A1 | 3/2012 | Gao |
| 2012/0078894 A1 | 3/2012 | Jiang |

FOREIGN PATENT DOCUMENTS

| | | |
|---|---|---|
| JP | 2005-517211 | 6/2005 |
| JP | 2005-531183 | 10/2005 |
| JP | 2009-516023 | 4/2009 |
| TW | 200637310 | 10/2006 |
| WO | 2012/106261 | 8/2012 |

OTHER PUBLICATIONS

Mihcak, M.K. et al., "A Perceptual Audio Hashing Algorithm: A Tool for Robust Audio Identification and Information Hiding," (2001) pp. 51-65, XP002356506.

Ozer, H. et al., "Perceptual Audio Hashing Functions," Eurasip Journal on Applied Signal Processing, (2005) No. 12, pp. 1780-1793, XP002487282.

Toguro, M. et al., "Video Stream Retrieval Based on Temporal Feature of Frame Difference," ICASSP (2005), pp. II-445-II-448, XP010790672.

Zhou, X., et al., "Perceptual Hashing of Video Content Based on Differential Block Similarity," CIS (2005) Part II, LNAI 3802, pp. 80-85, XP002479786.

Radhakrishnan, R. et al. "Audio Signature Extraction Based on Projections of Spectograms" Multimedia and Expo IEEE International Conference, Jul. 2, 2007, pp. 2110-2113.

Supangkat, S.H. et al. "A Public Key Signature for Authentication in Telephone" Circuits and Systems, Oct. 28-31, 2002, pp. 495-498.

EXTRACTING FEATURES OF AUDIO SIGNAL CONTENT TO PROVIDE RELIABLE IDENTIFICATION OF THE SIGNALS

TECHNICAL FIELD

The present invention pertains generally to the processing of video and audio signals and pertains more specifically to processes that extract features from video signals and audio signals to identify the signals. Throughout this disclosure, the term "video signals" and "video content" refer to signals and content that represent images intended for visual perception and the term "audio signals" and "audio content" refer to signals and content that represent sounds intended for aural perception.

BACKGROUND ART

Applications such as those that attempt to detect pirated content conveyed by video and audio signals or that attempt to resynchronize disassociated video and audio signals often rely on processes that examine signal content to identify the signals. For many of these applications, it is important to obtain a reliable identification of signals even when the content of those signals has been modified either unintentionally or intentionally such that the modified content can still be recognized by a human observer as being substantially the same as the original content. If the perceived difference between the content of an original signal and a modified signal is small, then preferably the identification process can extract identifying features from the original and modified signals that are very similar to one another.

Examples of unintentional modifications to signal content include the insertion or addition of noise to signals in transmission channels and on storage media. Examples of intentional modifications to video signals include luminance and color modifications such as contrast/brightness adjustments, gamma correction, luminance histogram equalization, color saturation adjustments and color correction for white balancing, include geometric modifications such as image cropping and resizing, image rotation and flipping, stretching, speck removal, blurring, sharpening and edge enhancement, and include coding techniques such as lossy compression. Examples of intentional modifications to audio signals include amplification, equalization, dynamic range modification, channel up-mixing, time-scale modification, spectral shaping and lossy data compression.

DISCLOSURE OF INVENTION

It is an object of the present invention to provide identification processes that can be used to obtain a reliable identification of video and audio signals even if the content of the signals has been modified by mechanisms such as those mentioned above.

This object is achieved by the present invention that is described below.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Introduction

Figure 1:
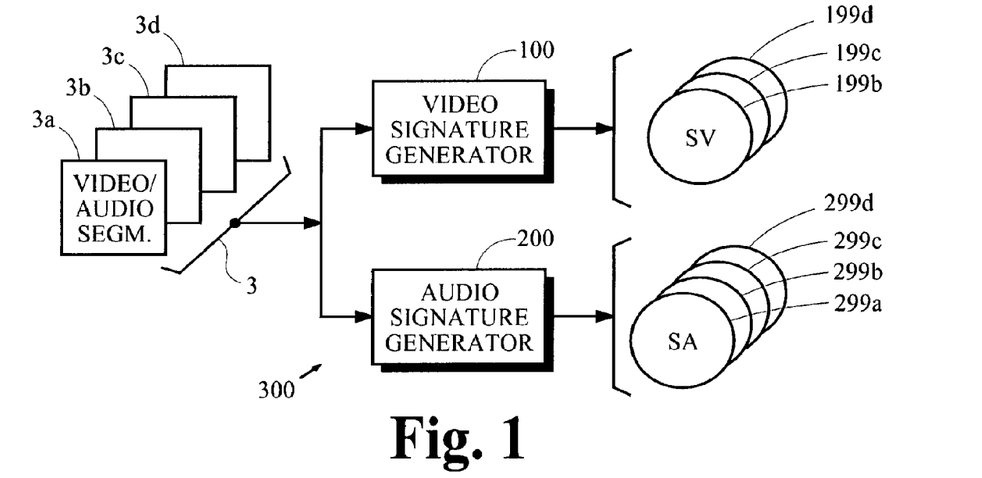
FIG. 1 is a schematic block diagram of a system that may be used to obtain a reliable identification of video and audio signals.

FIG. 1 is a schematic block diagram of an exemplary system 300 that examines the contents of segments 3a to 3d of a video/audio signal 3 to obtain a reliable identification of that signal. The video signature generator 100 obtains a set of video signatures (SV) 199b to 199d that identify video content and the audio signal generator 200 obtains a set of audio signatures (SA) 299a to 299d that identify audio content. In the example shown in the figure, individual signatures of video and audio content correspond to segments of the video/audio signal. This particular example is discussed further in the next few paragraphs, where each segment of the video/audio signal conveys a frame of video content and a segment of audio content. This particular correspondence between video/audio segments, video frames, audio segments and signatures is presented as only an example. Other arrangements are possible.

Figure 2:
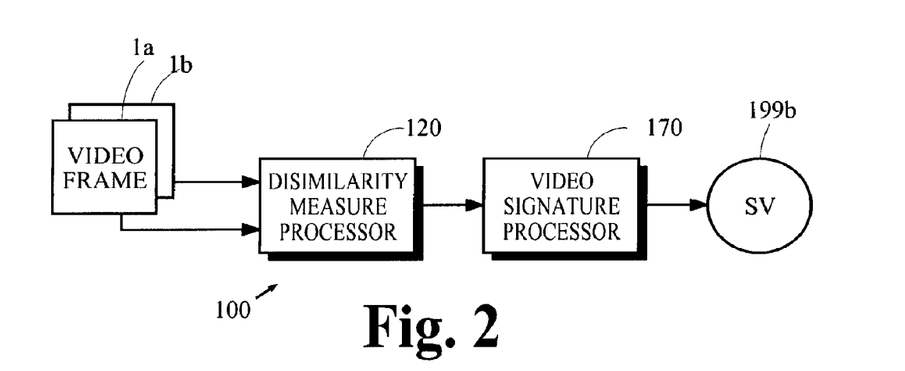
FIG. 2 is a schematic block diagram of a system that may be used to obtain a reliable identification of video signals.

FIG. 2 is a schematic block diagram of the video signature generator 100. The dissimilarity measure processor 120 examines the content of two video frames 1a, 1b within a sequence of video frames and generates intermediate values that represent one or more measures of dissimilarity between all or a portion of the two frames. If the content of each video frame is represented by an array of values expressing the intensity of discrete picture elements or pixels, for example, the intermediate values may be an array of differences between the average or standard deviation of intensities for groups of pixels. The video signature processor 170 applies a hash function to the intermediate values to generate a video signature (SV) 199b that identifies the content of the video frames.

Figure 3:
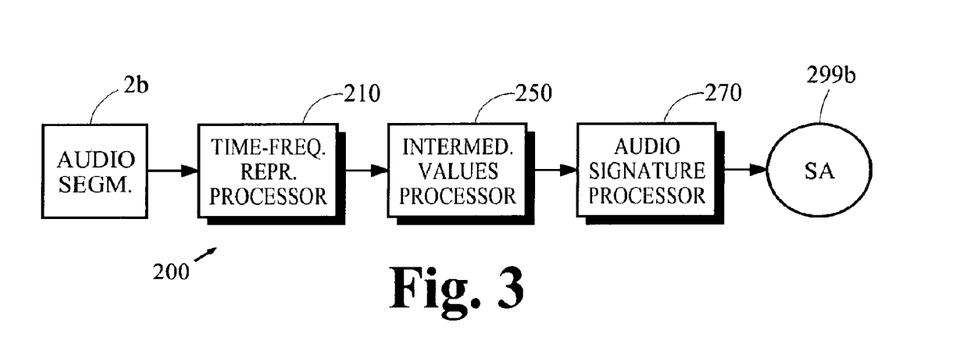
FIG. 3 is a schematic block diagram of a system that may be used to obtain a reliable identification of audio signals.

FIG. 3 is a schematic block diagram of the audio signature generator 200. The time-frequency representation processor 210 examines the content of an audio segment 2b within a sequence of segments and generates spectral values representing all or a portion of the spectral components of the audio content in the segment. If the audio content of the segment is represented by values expressing the amplitude of discrete samples, for example, the spectral values may be a set of coefficients within a time-frequency representation generated by a block time-domain to frequency-domain transform. The intermediate values processor 250 examines groups of the spectral values and derives an intermediate value from the intensities of the spectral values in each group. The audio signature processor 270 applies a hash function to the intermediate values to generate an audio signature (SA) 299b that identifies the content of the audio segment.

B. Video Signature Generator

The components of the video signature generator 100 may be implemented in a variety of ways. Preferred implementations generate a signature that is relatively insensitive to modifications of video content that have little or no perceptual effect. If modifications to video content have no significant effect on the perceived image, then preferably these modifications also have no significant effect on the generated signature. Some measure of difference between two video signatures is commensurate with a measure of difference between the two contents from which the signatures are generated. A few exemplary implementations are discussed below.

The implementations discussed below calculate intermediate values representing one or more measures of dissimilarity between video frames because the use of dissimilarity measures increases the sensitivity of the generated signature to motion and other changes in original content but eliminates or reduces sensitivity to modifications from subsequent processes such as those that change brightness or contrast, that convert between different color spaces or that apply color correction.

The intermediate values may be calculated for any two frames 1a, 1b of video content. The two frames may be adjacent video frames within a sequence of frames or they may be separated from one another by one or more intervening frames. If the two frames are separated by a specified interval of time rather than by a specified number of intervening frames, the intermediate values calculated for these two frames will generally be more resistant to modifications caused by coding process that change the video frame rate.

1. Dissimilarity Measure Processor

Figure 4A:
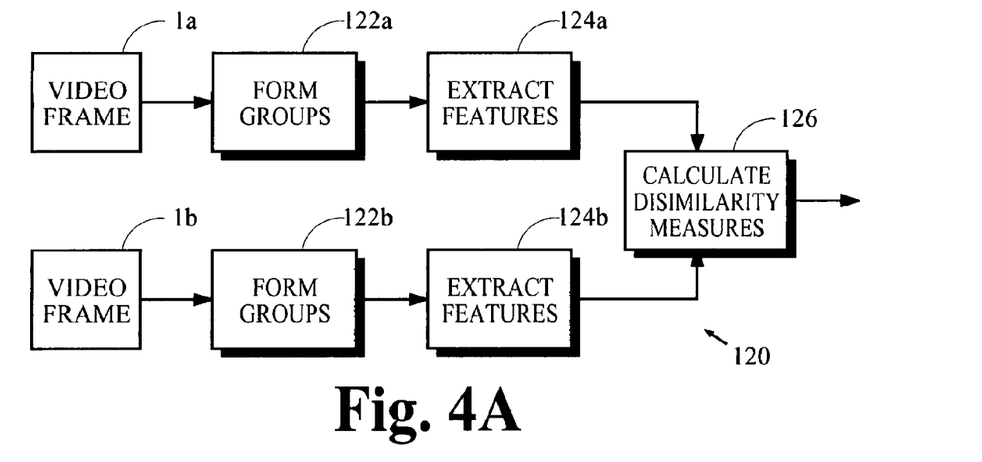
FIGS. 4A-4C are schematic block diagrams of processes that may be used to generate dissimilarity measures representing differences between two frames of video content.
Figure 4B:
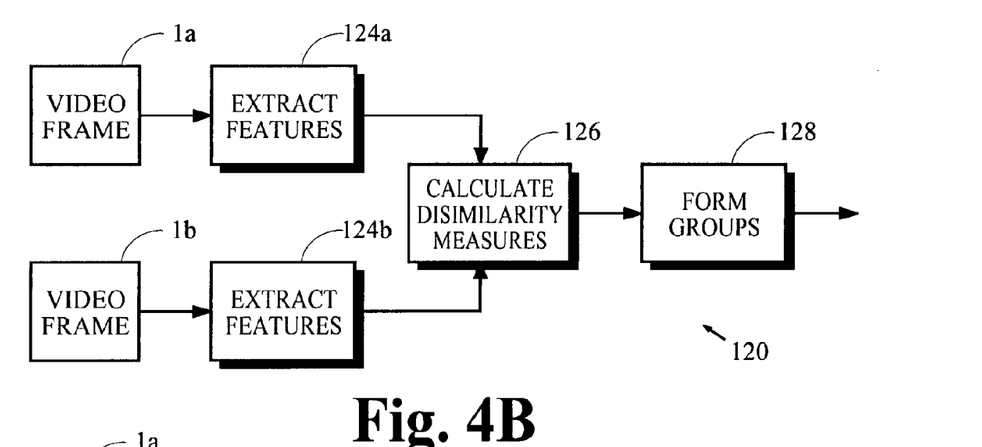
Figure 4C:
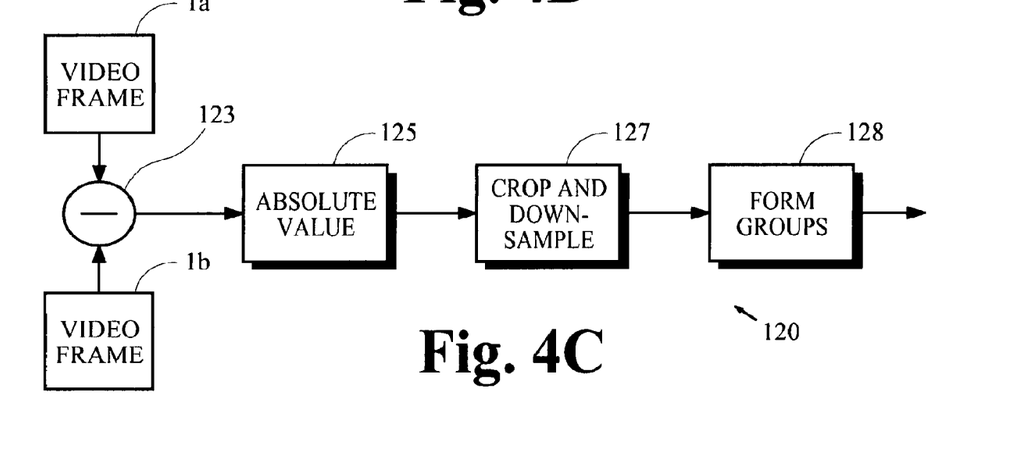

A few exemplary implementations of the dissimilarity measure processor 120 are illustrated in FIGS. 4A to 4C. Referring to FIG. 4A, the component 122a forms one or more groups of pixels from the video frame 1a and the component 124a extracts one or more features from each of these groups of pixels and calculates a value R representing each feature. The component 122b forms one or more groups of pixels from the video frame 1b and the component 124b extracts one or more features from each of these groups of pixels and calculates a value R representing each feature. The component 126 calculates intermediate values Q that represent the dissimilarity measures between the values R for corresponding features and corresponding groups of pixels in the two video frames 1a, 1b.

a) Pixel Group Formation

The components 122a and 122b may form pixel groups in essentially any way that may be desired. A few alternatives are discussed below. If desired, the information in the video frame that is used to generate the video signature may be limited to only a portion of the total image to avoid changes created by any processes that add letterboxes or graphics to edges or corners of the image. This may be achieved in a variety of ways such as by cropping the image prior to feature extraction, by cropping the array of values R that represent the extracted features after they have been calculated, or by cropping the array of dissimilarity values calculated from the values R. Preferably, this is achieved by cropping the image prior to feature extraction.

For video applications such as television, a suitable cropping selects a central portion of the image so that any logos or other graphical objects inserted into the video content near the edges of the image do not affect the extracted features. Cropping may also eliminate modifications to the image due to conversion between progressive-scan and interlaced-scan formats and between high-definition (HD) and standard definition (SD) formats. Cropping for one particular HD to SD format conversion is discussed in the following paragraphs.

If original video content in HD format with a resolution of 1080×1920 pixels is converted into SD format with a resolution of 480×640 pixels, for example, the original image can be cropped to select the central portion of the original image that remains in the converted image. An appropriate cropping removes 240 pixels from the left-hand edge and removes 240 pixels from right-hand edge of the original HD-format image to obtain an image with a resolution of 1080×1440 pixels having the same aspect ratio as the SD-format image. The cropped area may be adjusted to remove additional areas of the image that may be modified with logos or graphical objects as mentioned above.

The array of pixels may also be down-sampled to reduce sensitivity to modifications that can occur when frames of video are converted between different formats. In television applications, for example, the images may be down sampled to a resolution of 120×160 pixels, which is a convenient choice for HD and SD formats, and for progressive-scan an interlaced-scan formats. This downsampling may be implemented by examining parameters or other metadata conveyed with the video content to determine the horizontal and vertical resolution of the images conveyed in the video frames, selecting a factor in response to these resolutions, and downsampling the images by an amount equal to the factor. For the examples discussed here, a factor equal to nine is selected for the cropped HD-format image and a factor equal to four is selected for the SD-format image.

For example, suppose the content of an original video signal is in HD format with a resolution of 1080×1920 pixels. This content can be cropped to an image having a resolution of 1080×1440 pixels as described above and then down sampled by a factor of nine to a resolution of 120×160 pixels. Features can be extracted from this low-resolution image. Suppose further that the original video signal is converted to SD format with a resolution of 480×640 pixels. This converted image can be down sampled by a factor of four to a resolution of 120×160 pixels, allowing essentially the same features to be extracted from the converted signal as was done for the original signal. The same down sampling can be used to accommodate conversions from SD to HD formats and between progressive-scan and interlaced-scan formats. If appropriate down sampling is used, the feature extraction process and the subsequent signature generation process are insensitive to modifications that occur from conversions between formats.

If a video signal conveys content in an interlaced-scan format in which frames of video are arranged in two fields, it may be converted to a progressive-scan format before extracting features. Alternatively, greater independence from the choice of scan format can be achieved by extracting features from only one of the fields in an interlaced-scan frame. For example, features can be extracted from only the first field in a frame or from only the second field in the frame. Video content in the other field would be ignored. This process avoids the need to convert to a progressive-scan format before extracting features.

Figure 5A:
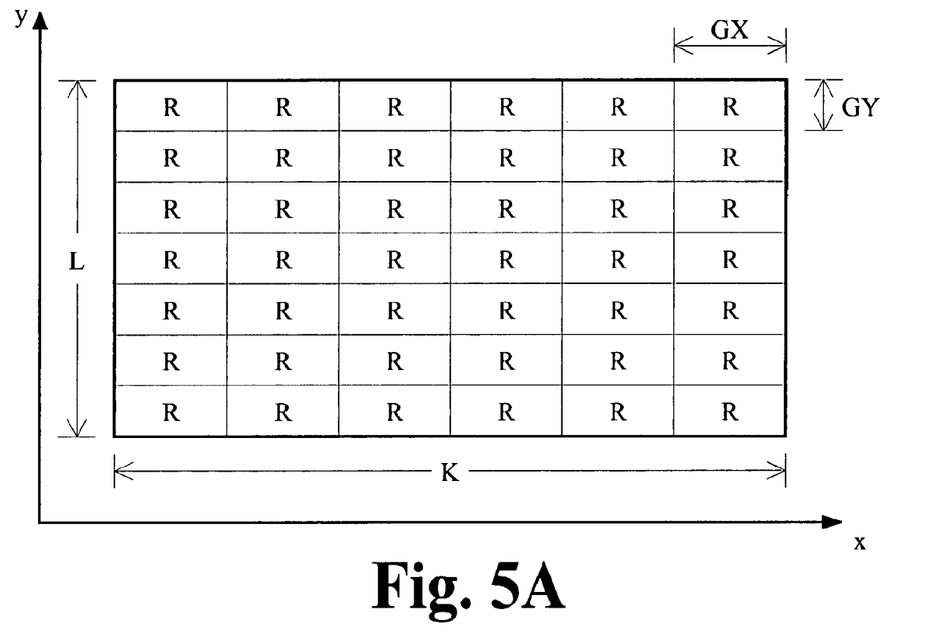
FIGS. 5A-5B are schematic block diagrams of a set of intermediate values in a low-resolution image.

In one implementation, pixel groups are formed in a down-sampled image having a resolution of 120×160 pixels. Referring to FIG. 5A, for example, the pixel groups are uniform in size and are GX pixels wide and GY pixels high. The horizontal size GX of the groups is chosen such that K·GX=RH and the vertical size GY of the groups is chosen such that L·GY=RV where RH and RV are the horizontal and vertical dimensions of the image, respectively, in each video frame. One suitable choice of values is GX=8, GY=8, K=15 and L=20. This describes a 15×20 array of groups, each group having a size of 8×8 pixels in the down-sampled image.

A similar result can be obtained by forming pixel groups in the original image with a size that is adjusted in response to the format of the image in the video frame. Continuing the examples described above, HD-format images are cropped to a size of 1080×1440 pixels and pixel groups are formed in the cropped image having a size of 72×72 pixels. This yields a 15×20 array of pixel groups. For images in SD format, pixel groups are formed in the original image having a size of 32×32 pixels, which yields a 15×20 array of pixel groups.

Figure 5B:
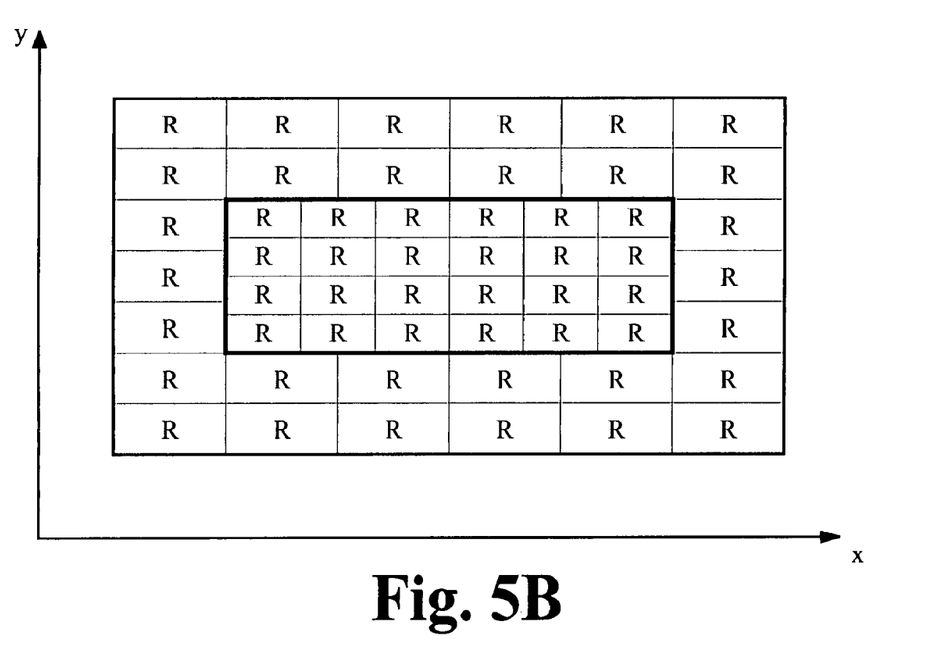

FIG. 5B illustrates groups of pixels that are not uniform in size. A 6×4 array of smaller pixel groups constitutes the central portion of the image. A set of larger pixel groups surrounds the groups in the central portion. This type of arrangement can be used advantageously with video frame information that has content in the central portion of each image that is perceptually more significant.

Pixel groups may be of essentially any size or shape. For example, the central portion of the image shown in FIG. 5B, which is surrounded by a rectangle drawn with wider lines, could constitute a single pixel group and the remaining portion of the image could constitute another pixel group.

Preferably, the pixels are low-pass filtered to reduce sensitivity to changes caused by any variations in pixel group alignment that may occur as the result of video content modification. The filtering may be performed one or more times during the pixel group formation process. For example, the pixels may be low-pass filtered before the down-sampling operations discussed above, immediately after the down-sampling operations and/or immediately after the formation of pixel groups. The size of the filter should be chosen to balance a trade off between resistance to changes in alignment on one hand and sensitivity to changes in video content on the other hand. A larger filter increases resistance to changes in alignment. A smaller filter increases the sensitivity to changes in video content. If the low-pass filter is applied to the 120×160 down-sampled image discussed above, empirical studies have shown good results can be obtained by using a 3×3 two-dimensional filter with all filter tap coefficients equal to one.

The following discussion of feature extraction refers to the exemplary grouping shown in FIG. 5A.

b) Feature Extraction

The components 124a and 124b extract one or more features from each pixel group and calculate a value R that represents each feature.

If each video frame conveys a monochromatic image, the features may be extracted from data e that represents the intensities of individual pixels. If each video frame conveys a color image comprising pixels represented by red, green and blue (RGB) values, for example, separate features may be extracted from the data e that represents each of the red, green, and blue pixel components. Alternatively, features may be extracted from data e that represents pixel luminance or brightness derived from the data that represents the red, green, and blue components.

One feature that may be extracted is average pixel intensity. A value $R_{AVE}$ representing this feature may be obtained from the following expression:

$$R_{AVE}(k, l) = \frac{1}{GX \cdot GY} \sum_{i=k \cdot GX}^{(k+1) \cdot GX - 1} \sum_{j=l \cdot GY}^{(l+1) \cdot GY - 1} e(i, j) \quad (1)$$

for $0 \leq k < K; 0 \leq l < L$ where $R_{AVE}(k, l)$=average intensity of pixels in a group of pixels (k, l);
  e(i, j)=intensity of pixel (i, j) within the group;
  GX=width of pixel groups expressed in numbers of pixels;
  GY=height of pixel groups expressed in numbers of pixels;
  K=horizontal resolution of the image, expressed in numbers of groups; and
  L=vertical resolution of the image, expressed in numbers of groups.

Another feature that may be extracted is the standard deviation of pixel intensity. Alternatively, the variance or square of the standard devation may be used. A value $R_{SD}$ representing standard deviation may be obtained from the following expression:

$$R_{SD}(k, l) = \sqrt{\frac{1}{GX \cdot GY} \sum_{i=k \cdot GX}^{(k+1) \cdot GX - 1} \sum_{j=l \cdot GY}^{(l+1) \cdot GY - 1} [e(i, j) - R_{AVE}(k, l)]^2} \quad (2)$$

for $0 \leq k < K; 0 \leq l < L$ where $R_{SD}(k, l)$=standard deviation of pixel intensities in a group of pixels (k, l).

Another feature that may be extracted is a histogram of pixel intensities. A set of values $R_{HIST}$ that represents this feature may be obtained by counting the number of pixels that have a particular intensity for each intensity within the range of possible intensities.

Yet another feature is the amplitude and/or phase of the spectrum. A set of values $R_{SPECTRUM}$ representing a spectrum can be obtained by applying a two-dimensional Fourier transform to the group of pixel intensities.

No particular feature is critical to the present invention; however, empirical results have shown that averages and standard deviations of pixel intensities are good choices for many applications.

If desired, the values R representing extracted features may be arranged in groups for subsequent processing. For example, spectral features represented by the set of values $R_{SPECTRUM}$ may be organized into groups according to frequency or phase.

Furthermore, features may be extracted from the calculated values R. For example, the standard deviation of average intensity $R_{AVE}$ or of spectral values $R_{SPECTRUM}$ may be calculated.

c) Dissimilarity Measure Calculation

The component 126 may calculate the intermediate values Q representing measures of dissimilarity E in a variety of ways. The choice of the measure is not critical in principle to the present invention but some measures may perform better depending upon the features that are extracted by the components 124a and 124b. Empirical studies may be needed to make an appropriate choice; however, the two measures described below have been found to give good results in a wide range of applications.

One measure of dissimilarity is the absolute value of the difference between values R representing corresponding features for corresponding groups of pixels in two different frames. This measure may be calculated from the following expression:

$$E(k,l,f_1,f_2) = |R(k,l,f_1) - R(k,l,f_2)| \text{ for } 0 \leq k < K; 0 \leq l < L \quad (3a)$$

where $E(k,l,f_1,f_2)$=dissimilarity between frames $f_1$ and $f_2$ in pixel group $(k, l)$; and $R(k, l, x)$=value representing extracted feature of pixel group $(k, l)$ in frame x.

If the extracted feature is represented by a value having two or more elements such as, for example, amplitudes in $R_{SPECTRUM}$ representing a spectral feature, a measure of dissimilarity may be calculated from the sum of the absolute values of differences between elements in the values R representing corresponding features for corresponding groups of pixels in two different frames. This measure may be calculated from the following expression:

$$E(k, l, f_1, f_2) = \sum_z |R(k, l, z, f_1) - R(k, l, z, f_2)| \quad (3b)$$

$$\text{for } 0 \leq k < K; 0 \leq l < L$$

where $R(k, l, z, x)$=element z in the value R for pixel group $(k, l)$ in frame x.

If desired, a composite measure of dissimilarity for two or more groups of pixels in the frames may be calculated from a similar expression as follows:

$$E(f_1, f_2) = \sum_k \sum_l \sum_z |R(k, l, z, f_1) - R(k, l, z, f_2)| \quad (3c)$$

where $E(f_1, f_2)$=composite measure dissimilarity between frames $f_1$ and $f_2$; and the limits of summation for k and l are chosen to include the desired groups. This particular example assumes the values R have more than one element. If the values have only one element, the summation over z is omitted.

Another measure of dissimilarity is the square of the difference between values R representing corresponding features for corresponding groups of pixels in two different frames. This measure may be calculated from the following expression:

$$E(k,l,f_1,f_2) = (R(k,l,f_1) - R(k,l,f_2))^2 \text{ for } 0 \leq k < K; 0 \leq l < L \quad (4a)$$

If the extracted feature is represented by a value having two or more elements, a measure of dissimilarity may be calculated from the sum of the squares of differences between elements in the values R representing corresponding features for corresponding groups of pixels in two different frames. This measure may be calculated from the following expression:

$$E(k, l, f_1, f_2) = \sum_z (R(k, l, z, f_1) - R(k, l, z, f_2))^2 \quad (4b)$$

$$\text{for } 0 \leq k < K; 0 \leq l < L$$

If desired, a composite measure of dissimilarity for two or more groups of pixels in the frames may be calculated from the following expression:

$$E(f_1, f_2) = \sum_k \sum_l \sum_z (R(k, l, z, f_1) - R(k, l, z, f_2))^2 \quad (4c)$$

where the limits of summation for k and l are chosen to include the desired groups. This particular example assumes the values R have more than one element. If the values have only one element, the summation over z is omitted.

In one implementation, the intermediate values Q are set equal to the calculated measures of dissimilarity E. An alternative is discussed below.

d) Alternative Implementation

If a difference between average pixel intensities is the only dissimilarity measure that is used for signature generation, the dissimilarity measure processor 120 may be implemented as shown in FIGS. 4B and 4C. In these implementations, pixel intensities or average intensities are extracted from the video frames 1a and 1b, measures of dissimilarity between the extracted features are calculated and the dissimilarity measures are formed into groups for subsequent signature generation.

In the exemplary implementations shown in FIGS. 4B and 4C, frames of video content are represented by an array of discrete pixels, the dissimilarity measure processor 120 obtains difference images each comprising an array of differential elements $\Delta$ by calculating the difference between corresponding pixels in two video frames. If each video frame conveys a color image comprising pixels represented by red, green and blue (RGB) values, for example, the differential elements may be calculated from the differences between respective red, green, and blue values for corresponding pixels. Preferably, the differential elements are calculated from the absolute differences between a luminance or brightness of corresponding pixels that is derived from the red, green, and blue values. If each video frame conveys a monochromatic image, the differential elements may be calculated from the difference between the intensities of corresponding pixels.

If desired, differential elements may be limited to only a portion of the total image to avoid changes created by any processes that add letterboxes or graphics to edges or corners of the image. This may be achieved by cropping the image prior to calculating the differential elements or by cropping the array of differential elements after they have been calculated.

The resolution of the difference image may also be changed as described above for pixel group formation. This may be done by modifying data in the video frames prior to calculating the differential elements or by modifying the differential elements after they have been calculated.

Referring to the implementation illustrated in FIG. 4C, the component 123 calculates the difference between values of corresponding pixels in a video frame 1*a* and a video frame 1*b* and the component 125 obtains a set of the differential elements Δ from the absolute values of the pixel differences. The component 127 performs cropping and down-sampling. The cropping operation retains only a central part of the difference image by removing differential elements near the top, bottom, right-hand and left-hand edges of the difference image. The down-sampling operation down samples the cropped difference image to generate an array of differential elements that has a specified size of 120×160 pixels regardless the format of the input video frames. This particular size is only exemplary. The component 128 forms the differential elements Δ into groups and calculates the average value for the differential elements in each group. If desired, the down-sampling and group-formation operations could be combined as explained above.

The operations that calculate differences, down-sample, crop and form groups may be performed in other orders. For example, the differential elements Δ may be calculated by first down sampling the contents of two video frames, cropping the two down-sampled images, forming groups of pixels in the cropped images, calculating an average intensity for the pixels in each group, and then calculating differences between corresponding average intensities in the two images.

Referring to the group formation operation 128 shown in FIG. 4C, the differential elements Δ are grouped into regions of a difference image where each region is GX elements wide and GY elements high. Intermediate values Q are derived from the intensities of the differential elements Δ by calculating the average intensity of the elements in each region. These intermediate values constitute a low-resolution representation of the difference image that has a resolution of K×L intermediate values. This is analogous to the formation of pixel groups discussed above and illustrated in FIGS. 5A and 5B. The exemplary implementation described in the following paragraphs uses a low-resolution image with elements that are arranged in the same way as the pixel groups shown in FIG. 5A.

The intermediate values may be obtained from the following expression:

$$Q(k, l) = \frac{1}{GX \cdot GY} \sum_{i=k \cdot GX}^{(k+1) \cdot GX - 1} \sum_{j=l \cdot GY}^{(l+1) \cdot GY - 1} \Delta(i, j) \quad (5)$$

for $0 \leq k < K; 0 \leq l < L$ where Q(k, l)=intermediate value in the low-resolution image;
GX=width of differential element groups expressed in numbers of elements;
GY=height of differential element groups expressed in numbers of elements;
K=horizontal resolution of the low-resolution image;
L=vertical resolution of the low-resolution image; and
Δ(i, j)=differential element.

The horizontal size GX of the groups is chosen such that K·GX=RH and the vertical size GY of the groups is chosen such that L·GY=RV where RH and RV are the horizontal and vertical resolutions of the difference image, respectively. For the exemplary implementation discussed above that generates elements in a down-sampled difference image with a resolution of 120×160, one suitable size for the groups is 8×8 pixels, which provides a low-resolution image with a resolution of 120/8×160/8=15×20. By using the lower-resolution intermediate values Q to generate the video signature rather than the higher-resolution differential elements, the generated video signature is less sensitive to processes that change details of video signal content but preserve average intensity.

2. Video Signature Processor

The implementation of the video signature processor 170 that is described in the following paragraphs generates a video signature from a K×L array of intermediate values Q obtained from either the array of values R shown in FIG. 5A or from a K×L array of differential elements Δ as described above in connection with the processor illustrated in FIG. 4C.

The video signature processor 170 applies a hash function to a K×L array of the intermediate values Q to generate a set of N hash bits. These hash bits constitute the video signature (SV) that identifies the content of the video frames. Preferably, the hash function is relatively insensitive to changes in the intermediate values but may be sensitive to changes in any hash key that may be used. Unlike a typical cryptographic hash function whose output changes significantly with a change to even a single bit of its input, a preferred hash function for this application provides an output that undergoes only small changes for small changes in the input intermediate values. This allows the generated video signature to change only slightly with small changes to video signal content.

One suitable hash function uses a set of N base matrices to generate a set of N hash bits. The base matrices $P_1$ to $P_N$ are K×L arrays of random-valued matrix elements. The matrix elements $p_n(k, l)$ of each base matrix $P_n$ may be generated from the following expression:

$$p_n(k,l) = RNG - \bar{p}_n \text{ for } 1 \leq n \leq N, 0 \leq k < K, 0 \leq l < L \quad (6)$$

where $p_n(k, l)$=matrix element (k, l) of base matrix $P_n$;
RNG=output of a random-number generator; and
$\bar{p}_n$=average value of the numbers generated by RNG for each interim matrix. The generator RNG generates random or pseudo-random values that are uniformly distributed in the range [0,1]. The initial state of the generator may be initialized by a hash key, thereby allowing the hash function and the generated video signature to be more cryptographically secure.

The set of N hash bits is obtained by first projecting the interim values Q onto each of the N base matrices, which may be expressed as:

$$H_n = \sum_{k=0}^{K-1} \sum_{l=0}^{L-1} Q(k, l) \cdot p_n(k, l) \text{ for } 1 \leq n \leq N$$

where $H_n$=the projection of the interim values onto the base matrix $P_n$.

The hash bits are then obtained by comparing each projection to the median value of all projections and setting the hash bit to a first value if the projection is equal to or exceeds the threshold and setting the hash bit to a second value if the projection is less than the threshold. This may be expressed as:

$$B_n = sgn(H_n - \overline{H}) \quad (7)$$

where $$sgn(x) = \begin{bmatrix} 0 & \text{for } x < 0 \\ 1 & \text{for } x \geq 0 \end{bmatrix}$$

and $\overline{H}$=median value of all projections $H_n$.

C. Audio Signature Generator

The components of the audio signature generator 200 may be implemented in a variety of ways. Preferred implementations generate a signature that is relatively insensitive to modifications of audio content that have little or no perceptual effect. If modifications to audio content have no significant effect on the perceived sound, then preferably these modifications also have no significant effect on the generated signature. Some measure of difference between two audio signatures is commensurate with a measure of difference between the two contents from which the signatures are generated. A few suitable implementations are discussed below.

1. Time-Frequency Representation Processor

In an exemplary implementation in which segments of an audio signal are represented by values expressing the amplitude of discrete samples, the time-frequency representation processor 210 obtains a set of spectral values from transform coefficients generated by applying a time-domain to frequency-domain transform to a sequence of overlapping blocks of audio samples within each segment. If desired, the spectral values may be limited to only a portion of the total bandwidth of the audio content to avoid changes created by any processes that alter the spectral shape of the audio content. For example, a limited representation may be obtained by excluding those transform coefficients generated by the transform that represent the lowest-frequency and highest-frequency spectral components or by bandpass filtering the audio content prior to application of the transform.

Figure 6:
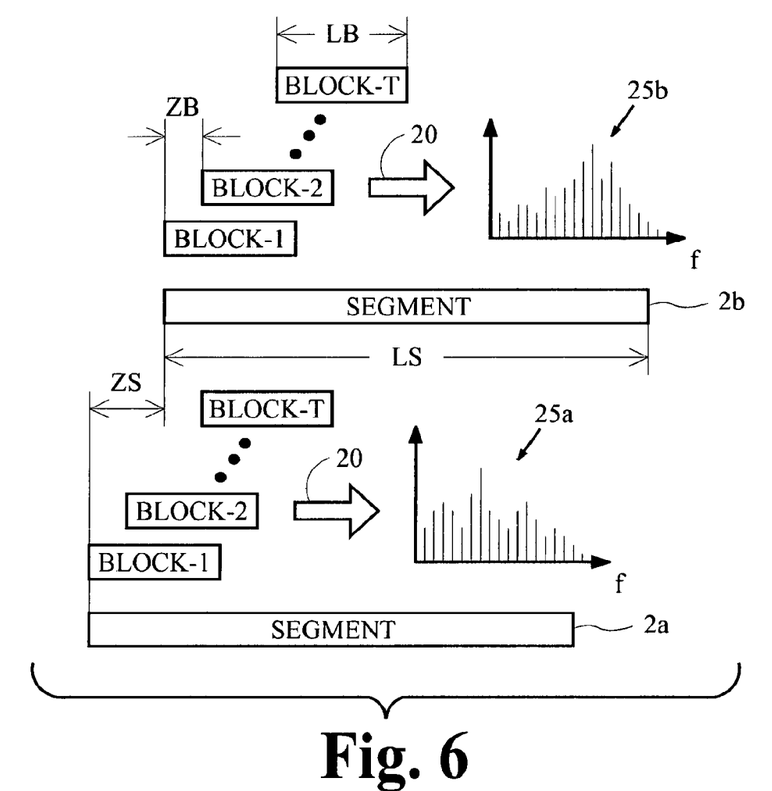
FIG. 6 is a schematic block diagram of a process that may be used to generate a time-frequency representation of a segment of audio content.

The operations performed by an exemplary implementation of the time-frequency representation processor 210 are illustrated schematically in FIG. 6. In this implementation, a segment of audio content 2a is divided into a sequence of T overlapping blocks BLOCK-1 to BLOCK-T. The length of each segment is LS samples and the length of each block is LB samples. The offset between the start of adjacent blocks is a number of samples ZB referred to as the block step size. A block transform is applied to each block of samples to generate a set of spectral values. FIG. 6 illustrates a transformation of one block BLOCK-2 by a transform 20 into a set of spectral values 25a. In this particular implementation, processing continues with the blocks in the next segment 2b after all T blocks in the segment 2a have been transformed into respective sets of spectral values. The offset between the start of adjacent segments is a number of samples ZS that is referred to as the segment step size.

The time resolution of the time-frequency representation is a function of the segment length, block length and block step size, which may be expressed as follows:

$$T = \frac{(LS - LB)}{ZB} \quad (8)$$

where T=time resolution or number of blocks in each segment;
LS=length of each segment in samples;
LS=length of each block in samples; and
ZB=block step size.

The frequency resolution is generally determined by the length of the block or the length of the transform that is used to generate the spectral values.

In one application discussed below that synchronizes video and audio content, audio content is divided into segments that are equal to the length of three video frames. For some television applications, the time interval spanned by three video frames is approximately 100 msec. If the audio sample rate is 48 kHz, then the audio segment length is 4,800 samples. The block length is chosen to be 256 samples and the block step size is chosen to be 32 samples. For this implementation, each audio segment has T=142 blocks; therefore, the time resolution of the time-frequency representation is equal to 142. A 256-point Fast Fourier Transform (FFT) is applied to each block of samples to generate 129 spectral values; therefore, the frequency resolution of the time-frequency representation is equal to 129. The segment step size is chosen to be 512 samples or approximately 10.7 msec.

2. Intermediate Values Processor

The intermediate values processor 250 examines groups of the spectral values and derives an intermediate value from the intensities of the spectral values in each group.

Figure 7:
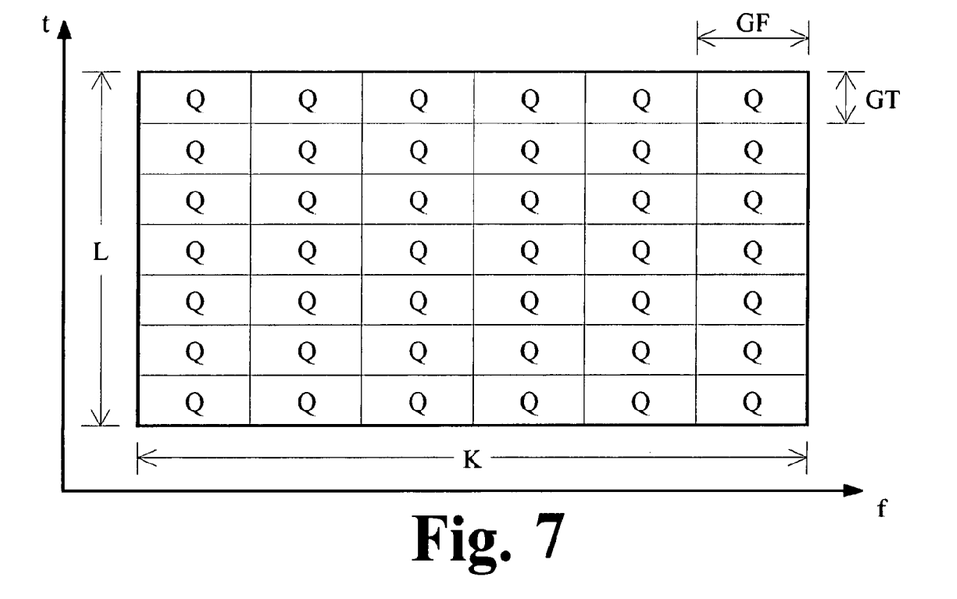
FIG. 7 is a schematic block diagram of a set of intermediate values in a low-resolution time-frequency representation.

In an exemplary implementation, the spectral values S are grouped into time-frequency regions where each region is GF spectral values wide and GT blocks long. Intermediate values Q are derived from the intensities of the spectral values by calculating the average intensity of the spectral values in each region. These intermediate values constitute a low-resolution time-frequency representation that has a resolution of K×L intermediate values. This is illustrated schematically in FIG. 7. The intermediate values may be obtained from the following expression:

$$Q(k, l) = \frac{1}{GF \cdot GT} \sum_{i=k \cdot GF}^{(k+1) \cdot GF - 1} \sum_{j=l \cdot GT}^{(l+1) \cdot GT - 1} S(i, j) \quad (9)$$

$$\text{for } 0 \leq k < K; 0 \leq l < L$$

where Q(k, l)=intermediate value in the low-resolution representation;
GF=width of spectral value groups expressed in numbers of values;
GT=length of spectral value groups expressed in numbers of blocks;
K=frequency resolution of the low-resolution representation;
L=time resolution of the low-resolution representation; and
S(i, j)=spectral values.

The size GF of the groups is chosen such that K·GF=RT and the size GT of the groups is chosen such that L·GT=RT where RF and RT are the frequency and time resolutions of the low-resolution representation, respectively. For the exemplary implementation discussed above and below, one suitable size for the groups is GF=6 and GT=14, which provides a low-resolution representation of $129/6 \times 142/14 \approx 20 \times 10$ intermediate values. By using the lower-resolution intermediate values Q to generate the audio signature rather than the higher-resolution time-frequency representation, the generated audio signature is less sensitive to processes that change details of spectral content but preserve average spectral levels.

The operations that calculate the time-frequency representation and the intermediate values may be performed in other ways. For example, a set of spectral values with a lower-frequency resolution may be obtained by decreasing the block length and transform length and increasing the length GT of the spectral value groups to obtain the same time resolution. If desired, the width GF of the groups can be varied across the spectrum. If high-frequency spectral components are deemed to be less significant than lower-frequency components for the generated signature, this relative significance can be realized by increasing the width of the groups for the higher frequencies.

3. Audio Signature Processor

The audio signature processor 270 applies a hash function to a K×L array of the intermediate values Q to generate a set of N hash bits. These hash bits constitute the audio signature (SA) that identifies the content of the audio segments. This may be done in the same way that is described above for the video signature.

D. Applications

The video and audio signature generators that are discussed above may be used in a variety of applications including an application that recovers lost synchronization between streams of video and audio content and applications that detect copies of video and audio content. Exemplary implementations for these applications are described below.

1. Video/Audio Synchronization

Streams of video and audio content are often synchronized with one another when they are recorded or created but synchronization may be lost during subsequent processing. In a television broadcasting system, for example, synchronized video and audio streams are often separated into two different paths for signal processing before they are assembled together for transmission. Different processing delays in the two paths can cause a loss of synchronization. The streams can be re-synchronized manually but this is tedious and prone to human error. The signature generators described above can be used to restore synchronization automatically. In a broadcast system, for example, synchronization can be restored at any point in the system including at the transmitter just prior to broadcast or at a receiver just prior to listening.

Techniques like those described above are used to generate signatures from streams of video and audio content when the video/audio streams are known to be synchronized. Alignment information that specifies the alignment between the video and audio content underlying these signatures is also captured. These video and audio signatures and the alignment information are provided to a "resync device" that is responsible for restoring synchronization between the two streams. The resync device receives streams of the video and audio content after these streams have been processed and have lost synchronization with one another, generates new signatures along with current alignment information, correlates the newly generated signatures and current alignment information with the original signatures and alignment information, and adjusts the current alignment until proper synchronization is achieved. One way in which this may be done is described below in more detail.

a) Exemplary Implementation Overview

Figure 8:
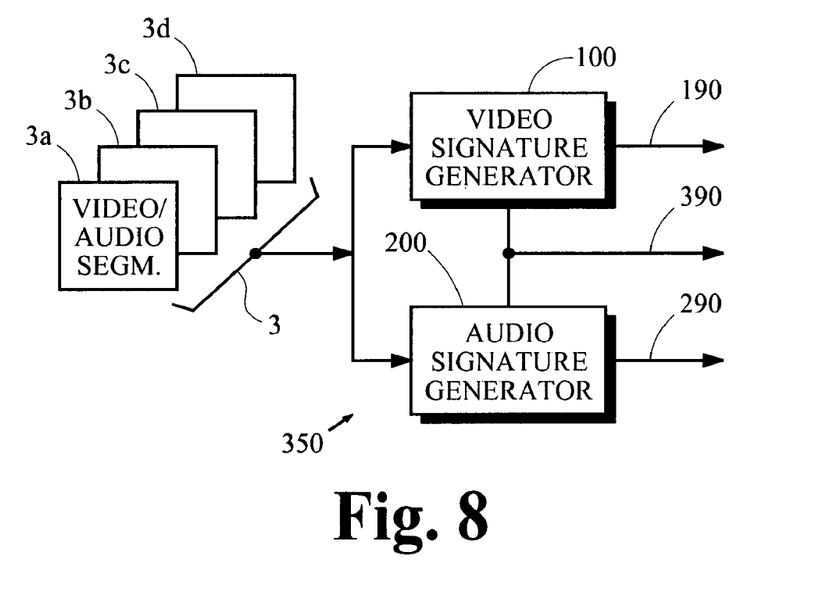
FIG. 8 is a schematic block diagram of a device that captures reference signatures and alignment information for synchronized video/audio streams.

FIG. 8 is a schematic block diagram of a capture device 350 that generates video and audio signatures and alignment information from synchronized video and audio streams. The synchronized video and audio content and streams are referred to herein as reference content and reference streams. The signatures and alignment information that are obtained from the reference streams are referred to herein as reference signatures and reference alignment information, respectively. The video signature is obtained by the video signature generator 100 and is passed along the path 190 for subsequent use by a resync device. The audio signature is obtained by the audio signature generator 200 and is passed along the path 290 for subsequent use by a resync device. Techniques that may be used to generate video and audio signatures are described above.

The capture device 350 also captures alignment information that may be represented in a variety of ways. For example, the alignment information may be implied by associating a particular video signature with an audio signature where the two signatures are generated from frames of video content and segments of audio content that begin at substantially the same time. In this context, the starting times of video and audio content are considered to be substantially the same if a human observer has difficulty telling which content precedes the other. As another example, the alignment information may be represented by time stamps or time offsets that are associated with the video and audio signatures and specify the relative timing of the underlying video content and audio content. If explicit alignment information is provided, it is passed along the path 390 for subsequent use by a resync device. No particular type of alignment information is critical. The examples discussed below are consistent with the assumption that the alignment information is implicit. These examples can be changed easily to account for any explicit time stamps or time offsets that may accompany the signatures.

Figure 9:
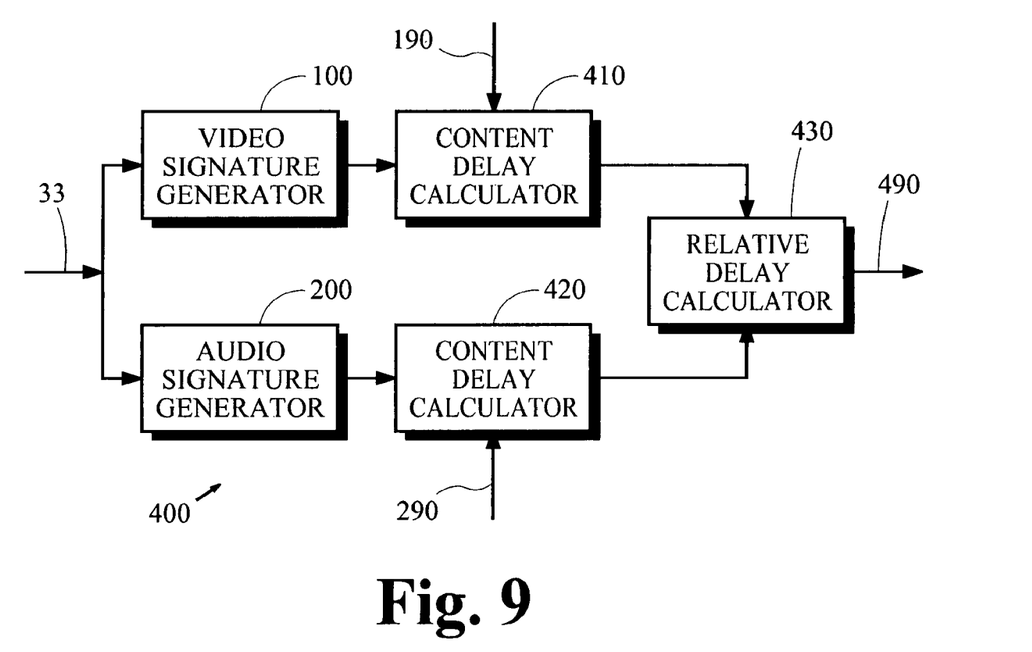
FIG. 9 is a schematic block diagram of a device that restores synchronization to video/audio streams.

FIG. 9 is a schematic block diagram of a resync device 400 that may be used to restore the synchronization between streams of video and audio content. The resync device 400 includes a video signature generator 100 and an audio signature generator 200 that generate video and audio signatures from streams of video and audio content received from the path 33. The content of these streams may have been modified intentionally and unintentionally by a variety of processes and may not by properly synchronized with one another. These video and audio content and streams are referred to herein as the current content and current streams. The signatures generated from the current streams are referred to herein as the current signatures.

The Content Delay Calculator 410 compares the current video signatures against the reference video signatures and estimates the relative timing difference between the underlying frames of the reference video content and the current video content that are deemed to be corresponding frames. The Content Delay Calculator 420 compares the current audio signatures against the reference audio signatures and estimates the relative timing difference between the underlying segments of the reference audio content and the current audio content that are deemed to be corresponding segments. For applications like broadcasting, the reference signatures and alignment information should be delivered to the content delay calculators before the current streams arrive so that sufficient information is available to restore synchronization in real time.

The Relative Delay Calculator 430 uses these relative timing differences to calculate an amount of delay that is needed to adjust either or both current streams to achieve proper synchronization. Information representing this delay is passed along the path 490 for use by other equipment to implement the delay. For example, suppose the relative video timing difference indicates the reference video frame precedes the corresponding current video frame by four seconds and the relative audio timing difference indicates the reference audio segment precedes the corresponding current audio segment by five seconds. The Relative Delay Calculator 430 can calculate an amount of delay equal to one second for the current video stream to achieve proper synchronization.

b) Content Delay Calculator

The two content delay calculators mentioned above compare sequences of reference and current signatures and estimate the relative timing difference between the underlying video/audio content. These calculators may be implemented in a variety of ways. One implementation using a Hamming distance function is described in the following paragraphs.

Suppose the current video stream is obtained from the reference video stream through a signal processing path that imposes a processing delay denoted by the symbol $\delta_V$. Suppose further that the current audio stream is obtained from the reference audio stream through a signal processing path that imposes a processing delay denoted by the symbol $\delta_A$. The Content Delay Calculator 410 compares the reference video signatures $SV_{REF}$ and the current video signatures $SV_{CURR}$ and generates an estimate $\epsilon_V$ of the video processing delay. The relative timing difference between the reference and current video streams can be obtained from the estimated delay $\epsilon_V$. The Content Delay Calculator 420 compares the reference audio signatures $SA_{REF}$ and the current audio signatures $SA_{CURR}$ and generates an estimate $\epsilon_A$ of the audio processing delay. The relative timing difference between the reference and current audio streams can be obtained from the estimated delay $\epsilon_A$.

One technique that may be used to estimate the processing delay is described in the following paragraphs. No distinction is made between video and audio because the video processing delay estimate $\epsilon_V$ and the audio processing delay estimate $\epsilon_A$ can be calculated in the same manner.

The content delay calculator receives two sets of signatures. One set is a sequence of reference signatures denoted $\{S_{REF}(i)\}$ and the second set is a sequence of current signatures denoted $\{S_{CURR}(i)\}$. The correlator searches over ranges of the two sequences to find a window in which the sets of signatures have the highest degree of correlation. This may be done by first computing the following scores:

$$D(m, i) = \sum_{j=0}^{W-1} HD[S_{REF}(i+j), S_{CURR}(m+j)] \quad (10)$$

for $1 \le i \le F$, $i - U \le m \le i + U$ where $D(m, i)$=calculated score for a particular alignment between streams;

$HD[r,c]$=Hamming distance between signatures r and c;
F=number of signatures in the set of reference signatures $\{S_{REF}(i)\}$;
U=the search range for the correlator; and
W=length of correlation window expressed as a number of signatures. The Hamming distance is equal to the number of bit positions in which two signatures differ.

The estimated processing delay may be derived from the value of m where the closest match between reference and current signatures within the correlation window is found. This can be expressed as:

$$\epsilon_i = \mathrm{argmin}_{m}[D(m, i)] \text{ for } i - U \le m \le i + U \quad (11)$$

If there is no processing delay, then $\epsilon_i$=i. If the estimated delay is three frames or three segments, then $\epsilon_i$=i+3. The relative timing difference for the frame or segment that corresponds to the signature $S_{REF}(i)$ is the offset between $\epsilon_i$ and i. The relative timing difference for video frame i is denoted herein as dv(i) and the relative timing difference for audio segment i is denoted herein as da(i).

In one implementation for television, the values W=10 and U=45 are used by the Content Delay Calculator 410 for video frames and the values W=23 and U=47 are used by the Content Delay Calculator 420 for audio segments. The values for F used in the video and audio delay calculators are the numbers of video frames and audio segments, respectively, in the reference streams.

Figure 10:
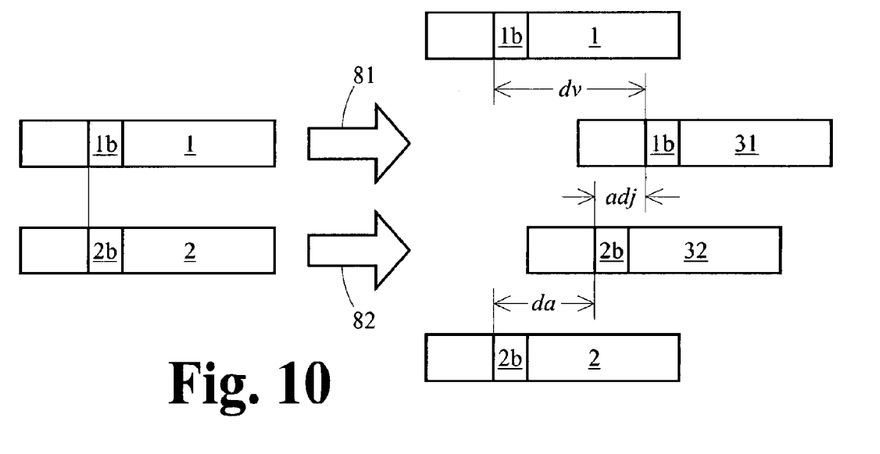
FIG. 10 is a schematic block diagram illustrating timing delays in video/audio streams.

The Relative Delay Calculator 430 uses the relative timing differences for the video and audio streams to calculate an amount of delay for either or both current streams to achieve proper synchronization. This is illustrated schematically in FIG. 10. The reference video frame 1b in a reference video stream 1 and the reference audio segment 2b in a reference audio stream 2 are shown in synchronization. Signal processing 81 for the video stream 1 and signal processing 82 for the audio stream 2 introduce different delays into the two streams. As a result, the current video frame 1b in the current video stream 31 and the current audio segment 2b in the current audio stream 32 are no longer in synchronization. The current video frame 1b has been delayed by dv and the current audio segment 2b has been delayed by da. The adjustment to delay adj that is needed to restore synchronization is equal to (dv−da). If dv is greater than da as shown in the figure, then synchronization may be restored by delaying the audio segment by the adjustment adj. If dv is less than da then synchronization may be restored by delaying the video frame by the adjustment adj. The streams can be delayed in essentially any way that may be desired but one way is to store and retrieve stream content in a first-in first-out (FIFO) buffer that has sufficient capacity to provide the adjustment to the delay.

2. Detection of Copies

The signatures that are generated from video and audio content can be used to identify the content even when that content has been modified by a variety of processes including those mentioned above. The ability to determine reliably whether specified video content or audio content is a copy of a reference video content or audio content, even when modified, can be used in a variety of applications. A few examples are described briefly in the following list:

Detection of unauthorized copies: Networks of peer-to-peer servers can facilitate the distribution of content but they can also increase the difficulty of detecting unauthorized or pirated copies of proprietary content because many copies of the content can exist among the peer-to-peer servers. A facility can automatically determine if any unauthorized copies exist in the network by generating signatures for all the content available from the network and checking these signatures against a database of reference signatures.

Confirmation of broadcast: Businesses that contract with broadcast networks to distribute specified video and audio content can confirm the terms of the contract were met by generating signatures from signals received by a broadcast receiver and comparing these signatures to reference signatures for the specified content.

Identification of reception: Businesses that provide ratings for broadcast networks can identify content that is received by a receiver by generating signatures from the received signals and comparing those signatures against reference signatures.

Figure 11:
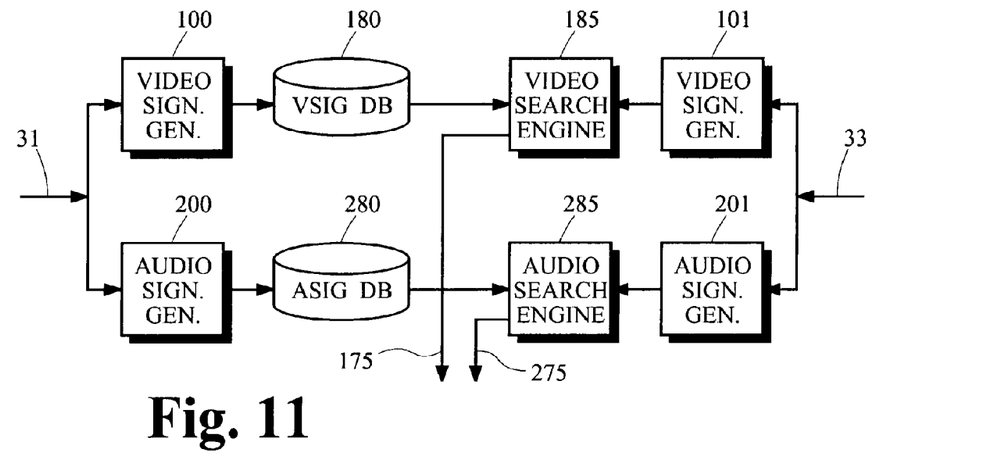
FIG. 11 is a schematic block diagram of a device that manages a signature database for detection of copies of video or audio content.

FIG. 11 is a schematic block diagram of a system that may be used to implement a variety of applications such as those mentioned in the preceding list. The video signature generator 100 and the audio signature generator 200 generate reference video signatures and reference audio signatures from reference video/audio streams of content received from the path 31. The generated reference video signatures are stored in the video-signature database (VSIG DB) 180 and the generated reference audio signatures are stored in the audio-signature database (ASIG DB) 280. The reference signatures may be stored with other information that may facilitate implementation of the application. For example, the reference signatures may be stored with the underlying content itself or with data that identifies information about the content such as the content owner, content licensing terms, title of the content or a textual description of the content. Each reference signature has a database search key. This key may be derived in any manner that may be desired. Preferably, the key is based on or derived from the reference signature itself.

The identity of any specified video content or audio content may be checked against reference content represented by information stored in the video and audio databases. The content whose identity is to be checked is referred to herein as the test content. The identity of the test video content may be checked by having the video signature generator 101 generate test video signatures from the test video content received from the path 33 and passing the test video signatures to the video search engine 185. The video search engine 185 attempts to find reference video signatures in the video-signature database 180 that are exact or close match to the test video signatures. The identity of the test audio content may be checked by having the audio signature generator 201 generate test audio signatures from the test audio content received from the path 33 and passing the test audio signatures to the audio search engine 285. The audio search engine 285 attempts to find reference audio signatures in the audio-signature database 280 that are exact or close match to the test audio signatures.

In one implementation, the search engines calculate the Hamming distances between the test signatures and the reference signatures stored in the databases and searches for a sequence of reference signatures that are closest to a sequence of the test video signatures. The calculations shown above in expressions 10 and 11 or some variation of them may be used to conduct the search. If the distance between two sequences of signatures is less than some threshold, the test content associated with the sequence of test signatures is deemed to be an exact or modified copy of the reference content that is associated with the sequence of matching reference signatures. Empirical results suggest that good results can be obtained for a variety of video and audio content using sequences of signatures that represent about two seconds of content.

E. Implementation

Figure 12:
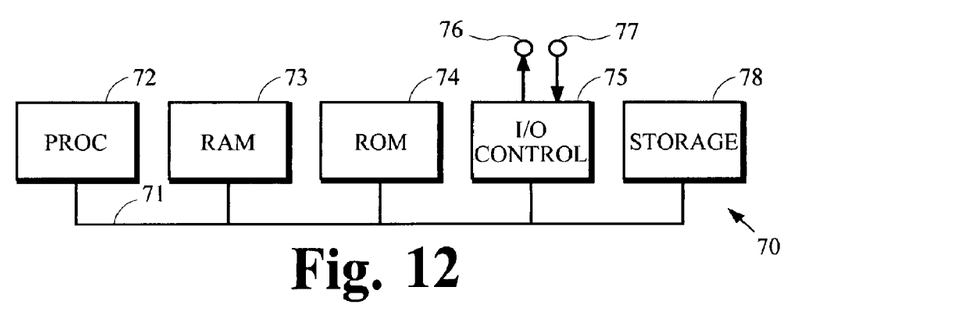
FIG. 12 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 12 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general-purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:
1. A method for generating a signature that identifies content of an audio signal, wherein the method performed by a device comprises:
   obtaining, by a device, a time-frequency representation of a set of blocks within a sequence of blocks of the audio signal, wherein the time-frequency representation comprises sets of spectral values, each set of spectral values representing all spectral components within at least a portion of the bandwidth of the audio signal in a respective block in the set of blocks;
   deriving, by a device, intermediate values from intensities of all the spectral values arranged in groups of one or more spectral values within a respective set of spectral values; and generating, by a device the signature that identifies content of the audio signal by projecting the intermediate values onto a set of random vectors, wherein the signature is represented by bits and each bit of the signature is derived from contributions from all of the intermediate values;

wherein each respective vector in the set of random vectors has vector elements with values that are obtained from a difference between uniformly distributed random variables within a range from zero to one and an average of the uniformly distributed random variables for all vector elements of the respective vector;

the projection of the intermediate values onto a respective random vector is obtained from an inner product of the intermediate values with the vector elements of the respective vector; and each component of the signature has either a first value when the projection of the intermediate values onto a corresponding random vector is greater than a threshold or has a second value when the projection of the intermediate values onto the corresponding random vector is less than a threshold, wherein the threshold is equal to a median of the projections of intermediate values onto the set of random vectors.

2. The method of claim 1, wherein:

the time-frequency representation is obtained by applying a time-to-frequency transform to each block of the audio signal in the set of blocks to obtain a respective set of spectral values; and a respective intermediate value is derived by calculating an average intensity of the one or more spectral values in a group within the respective set of spectral values.

3. The method of claim 1, wherein the groups of spectral values have numbers of spectral values that vary with frequency.

4. The method of claim 3, wherein the groups of spectral values for higher frequencies have a greater number of spectral values.

5. The method of claim 1, wherein each component of the signature is derived from the projection of the intermediate values onto a respective random vector.

6. An apparatus for generating a signature that identifies content of an audio signal, wherein the apparatus comprises:

means for obtaining a time-frequency representation of a set of blocks within a sequence of blocks of the audio signal, wherein the time-frequency representation comprises sets of spectral values, each set of spectral values representing all spectral components within at least a portion of the bandwidth of the audio signal in a respective block in the set of blocks;

means for deriving intermediate values from intensities of all the spectral values arranged in groups of one or more spectral values within a respective set of spectral values; and means for generating the signature that identifies content of the audio signal by projecting the intermediate values onto a set of random vectors, wherein the signature is represented by bits and each bit of the signature is derived from contributions from all of the intermediate values;

wherein each respective vector in the set of random vectors has vector elements with values that are obtained from a difference between uniformly distributed random variables within a range from zero to one and an average of the uniformly distributed random variables for all vector elements of the respective vector;

the projection of the intermediate values onto a respective random vector is obtained from an inner product of the intermediate values with the vector elements of the respective vector; and each component of the signature has either a first value when the projection of the intermediate values onto a corresponding random vector is greater than a threshold or has a second value when the projection of the intermediate values onto the corresponding random vector is less than a threshold, wherein the threshold is equal to a median of the projections of intermediate values onto the set of random vectors.

7. The apparatus of claim 6, wherein:

the time-frequency representation is obtained by applying a time-to-frequency transform to each block of the audio signal in the set of blocks to obtain a respective set of spectral values; and a respective intermediate value is derived by calculating an average intensity of the one or more spectral values in a group within the respective set of spectral values.

8. The apparatus of claim 6, wherein the groups of spectral values have numbers of spectral values that vary with frequency.

9. The apparatus of claim 8, wherein the groups of spectral values for higher frequencies have a greater number of spectral values.

10. The apparatus of claim 6, wherein each component of the signature is derived from the projection of the intermediate values onto a respective random vector.

11. A non-transitory computer readable storage medium that records a program of instructions that is executable by a device to perform a method for generating a signature that identifies content of an audio signal, wherein the method comprises:

obtaining a time-frequency representation of a set of blocks within a sequence of blocks of the audio signal, wherein the time-frequency representation comprises sets of spectral values, each set of spectral values representing all spectral components within at least a portion of the bandwidth of the audio signal in a respective block in the set of blocks;

deriving intermediate values from intensities of all the spectral values arranged in groups of one or more spectral values within a respective set of spectral values; and generating the signature that identifies content of the audio signal by projecting the intermediate values onto a set of random vectors, wherein the signature is represented by bits and each bit of the signature is derived from contributions from all of the intermediate values;

wherein each respective vector in the set of random vectors has vector elements with values that are obtained from a difference between uniformly distributed random variables within a range from zero to one and an average of the uniformly distributed random variables for all vector elements of the respective vector;

the projection of the intermediate values onto a respective random vector is obtained from an inner product of the intermediate values with the vector elements of the respective vector; and each component of the signature has either a first value when the projection of the intermediate values onto a corresponding random vector is greater than a threshold or has a second value when the projection of the intermediate values onto the corresponding random vector is less than a threshold, wherein the threshold is equal to a median of the projections of intermediate values onto the set of random vectors.

12. The storage non-transitory computer readable storage medium of claim 11, wherein:
- the time-frequency representation is obtained by applying a time-to-frequency transform to each block of the audio signal in the set of blocks to obtain a respective set of spectral values; and
- a respective intermediate value is derived by calculating an average intensity of the one or more spectral values in a group within the respective set of spectral values.

13. The non-transitory computer readable storage medium of claim 11, wherein the groups of spectral values have numbers of spectral values that vary with frequency.

14. The non-transitory computer readable medium of claim 13, wherein the groups of spectral values for higher frequencies have a greater number of spectral values.

15. The non-transitory computer readable storage medium of claim 11, wherein each component of the signature is derived from the projection of the intermediate values onto a respective random vector.

\* \* \* \* \*